US010217330B2

United States Patent
Oe et al.

(10) Patent No.: US 10,217,330 B2
(45) Date of Patent: Feb. 26, 2019

(54) MONEY HANDLING SYSTEM AND MONEY HANDLING METHOD

(71) Applicant: GLORY LTD., Himeji-shi, Hyogo (JP)

(72) Inventors: Takahiro Oe, Hyogo (JP); Shingo Hashimoto, Hyogo (JP)

(73) Assignee: GLORY LTD., Himeji-shi, Hyogo (JP)

( * ) Notice: Subject to any disclaimer, the term of this patent is extended or adjusted under 35 U.S.C. 154(b) by 0 days.

(21) Appl. No.: 15/511,399

(22) PCT Filed: Sep. 18, 2014

(86) PCT No.: PCT/JP2014/074743
§ 371 (c)(1),
(2) Date: Mar. 15, 2017

(87) PCT Pub. No.: WO2016/042645
PCT Pub. Date: Mar. 24, 2016

(65) Prior Publication Data
US 2017/0256142 A1 Sep. 7, 2017

(51) Int. Cl.
*G06Q 20/20* (2012.01)
*G07G 1/12* (2006.01)
(Continued)

(52) U.S. Cl.
CPC ............... *G07G 1/12* (2013.01); *G06Q 20/20* (2013.01); *G06Q 20/209* (2013.01);
(Continued)

(58) Field of Classification Search
CPC .......... G07G 1/12; G07G 5/00; G07G 1/0036; G07F 5/24; G07F 17/42; G07F 9/04; G06Q 20/209; G06Q 20/387
(Continued)

(56) References Cited

U.S. PATENT DOCUMENTS 5,895,457 A * 4/1999 Kurowski ............... G06Q 20/20
194/206
6,298,329 B1 * 10/2001 Walker ................. G06Q 10/087
705/14.25
(Continued)

FOREIGN PATENT DOCUMENTS

JP 08016895 A * 1/1996
JP 2002-133468 A 5/2002
(Continued)

*Primary Examiner* — Claude J Brown
(74) *Attorney, Agent, or Firm* — Renner, Kenner, Greive, Bobak, Taylor & Weber

(57) ABSTRACT

A money handling system includes: a cash settlement apparatus configured to, in a case where change is to be paid to the customer, execute either a process of dispensing the change or a process of issuing a change ticket including information on an amount of the change; a change handling apparatus configured to, obtain the information included in the change ticket and specify an amount of the not-yet-dispensed change; and a cash management apparatus connected to the cash settlement apparatus and the change handling apparatus, and configured to manage information regarding the change ticket of the not-yet-dispensed change. The change that has not been dispensed from the cash settlement apparatus can be dispensed from the change handling apparatus by using the change ticket.

15 Claims, 5 Drawing Sheets

(51) Int. Cl.
*G07G 5/00* (2006.01)
*G07F 9/04* (2006.01)
*G07F 17/42* (2006.01)
*G07G 1/00* (2006.01)
*G06Q 20/38* (2012.01)
*G07F 5/24* (2006.01)

(52) U.S. Cl.
CPC .............. *G06Q 20/387* (2013.01); *G07F 5/24* (2013.01); *G07F 9/04* (2013.01); *G07F 17/42* (2013.01); *G07G 1/0036* (2013.01); *G07G 5/00* (2013.01)

(58) Field of Classification Search
USPC ........................................................ 235/494
See application file for complete search history.

(56) References Cited

U.S. PATENT DOCUMENTS

| | | | | |
|---|---|---|---|---|
| 6,386,323 | B1* | 5/2002 | Ramachandran | E04H 14/00 186/36 |
| 6,845,907 | B1* | 1/2005 | Enright | G07F 19/203 235/375 |
| 2003/0040927 | A1* | 2/2003 | Sato | G06Q 20/20 705/1.1 |
| 2004/0032083 | A1* | 2/2004 | Walker | G06Q 10/087 273/269 |
| 2004/0249711 | A1* | 12/2004 | Walker | G06Q 10/06375 705/14.24 |
| 2005/0182681 | A1* | 8/2005 | Bruskotter | G06Q 20/204 705/15 |
| 2006/0144923 | A1* | 7/2006 | VanKirk | G06Q 20/042 235/379 |
| 2007/0275777 | A1* | 11/2007 | Walker | G07F 17/3227 463/16 |
| 2009/0275397 | A1* | 11/2009 | Van Baltz | G07F 17/32 463/25 |
| 2011/0047024 | A1* | 2/2011 | Anstee | G06Q 30/0238 705/14.38 |

FOREIGN PATENT DOCUMENTS

| | | |
|---|---|---|
| JP | 2005-56116 A | 3/2005 |
| JP | 2006-127051 A | 5/2006 |
| JP | 2009-9303 A | 1/2009 |
| JP | 2013-175044 A | 9/2013 |
| JP | 2014-119880 A | 6/2014 |

* cited by examiner

| Management No. | Dispensing code | Amount of not-yet-dispensed change | Occurrence date/time | Settlement apparatus ID | Expiration date | Date of change dispensing | Dispensing apparatus ID |
|---|---|---|---|---|---|---|---|
| 001 | 012345··· | ¥2,000 | 201408··· | A123··· | 201409··· | 201409··· | B123··· |
| 002 | 987654··· | ¥840 | 201409··· | A456··· | 201410··· | - | - |
| ⋮ | | | | | | | |

MONEY HANDLING SYSTEM AND MONEY HANDLING METHOD

TECHNICAL FIELD

The present invention relates to money handling systems and money handling methods for depositing and dispensing money, and more particularly, to a money handling system and a money handling method for handling money that is given and received when a commodity transaction is performed.

BACKGROUND ART

Conventionally, in stores such as supermarkets and convenience stores, money handling systems for performing giving and receiving of money regarding the prices of commodities have been used when commodity transaction is performed. For example, Patent Literature 1 discloses a settlement system including a POS (Point of Sale) register configured to calculate the total amount of the prices of commodities a customer has purchased, and a cash settlement apparatus configured to perform inputting of deposited money received for the commodity prices from the customer, and dispensing of change.

A barcode reader is connected to the POS register. The barcode reader reads barcodes assigned to the respective commodities, and recognizes the prices of the respective commodities by referring to commodity information managed by a POS server, whereby the total amount of the prices of the commodities is calculated. The cash settlement apparatus is a money handling apparatus capable of performing money depositing and dispensing processes, and has a function of depositing and dispensing money while recognizing and counting the money, and a function of receiving, from the POS register, the total amount of the prices of the commodities the customer has purchased. Specifically, the cash settlement apparatus is configured to perform: a depositing process of recognizing and counting deposited money from a customer, and storing the deposited money therein; and a dispensing process of dispensing change, according to need, on the basis of the total amount of the deposited money and the total amount of the prices of the commodities.

In a store, the POS register and the cash settlement apparatus are located at a checkout counter in a checkout area where checkout regarding commodity transaction is performed. As a mode of installation of a POS register and a cash settlement apparatus, the POS register and the cash settlement apparatus may be incorporated in a register lane, and a cashier may perform a work of reading barcodes assigned to commodities, receive deposited money from a customer, and pay change. In another mode, only the POS register may be incorporated in the register lane, and the cash settlement apparatus may be located in a place apart from the register lane. In this case, the cashier at the register lane performs only the work of reading the barcodes assigned to the commodities by using the POS register, and after the total amount of the prices of the commodities is calculated, the customer, who has moved from the register lane to the place where the cash settlement apparatus is located, pays cash and receives change by themselves. Besides, there is a mode called "self-checkout" in which the customer performs all the works of reading the barcodes assigned to the commodities, paying cash, and receiving change by themselves.

It is possible to suppress occurrence of artificial mistakes and strictly manage cash by performing, using the settlement system, the processes regarding giving and receiving of cash, such as the process of recognizing the prices of commodities to calculate the total amount thereof, the process of recognizing and counting cash received as deposited money to calculate the total amount thereof and storing the deposited money therein, and the process of calculating the amount of change and dispensing the change.

CITATION LIST

Patent Literature

[PTL 1] Japanese Laid-Open Patent Publication No. 2013-175044

SUMMARY OF THE INVENTION

Problems to be Solved by the Invention

In the above-described conventional technique, however, there are cases where a shortage of cash that can be used as change occurs in the cash settlement apparatus, and strict management of cash cannot be performed. Specifically, there are cases where, after the total amount of the prices of commodities is calculated by the POS register and deposited money received from a customer is inputted to the cash settlement apparatus, part or all of change cannot be dispense because of shortage of cash for change stored in the cash settlement apparatus. In this case, for example, the change is paid from cash manually managed by the cashier. Since giving and receiving of cash are manually performed, if a mistake occurs when cash is given or received, strict management of the cash cannot be realized. Further, the customer who cannot receive the change because of shortage of cash for change has to wait longer than usual before receiving the change. Further, checkout at the register lane cannot be performed while the cashier or the like is handling the change that has not yet been dispensed. In addition, while the casher or the like replenishes cash in the cash settlement apparatus in which shortage of cash for change has occurred, the cash settlement apparatus cannot be used. Thus, many customers waiting for checkout have to queue.

The present invention is made to solve the above-described problems of the conventional technique, and an object of the present invention is to provide a money handling system and a money handling method which are able to continue strict management of cash without keeping customers waiting even when a shortage of cash for change occurs in a money handling apparatus that dispenses change when a commodity transaction is performed.

Solution to the Problems

In order to solve the above-described problems and achieve the object, the present invention provides a money handling system configured to handle cash that is given and received when a commodity transaction is performed. The system includes: a cash settlement apparatus configured to, in a case where cash corresponding to a difference between a total amount of deposited money paid for a commodity price by a customer and the commodity price is required to be paid as change to the customer, execute either a process of dispensing the change or a process of issuing a change ticket including information that specifies an amount of the change; a change handling apparatus configured to, in order to pay not-yet-dispensed change to the customer, obtain the information included in the change ticket and specify an amount of the not-yet-dispensed change; and a cash management apparatus communicably connected to the cash settlement apparatus and the change handling apparatus, and configured to manage information regarding the not-yet-dispensed change for which the change ticket has been issued.

Further, according to the present invention, in the above invention, the cash settlement apparatus determines to perform either the process of dispensing the change or the process of issuing the change ticket, on the basis of a result of comparison between the amount of the change and an amount of cash that can be dispensed as change from the cash settlement apparatus.

Further, according to the present invention, in the above invention, the cash settlement apparatus, when issuing the change ticket, sets an expiration date by which the not-yet-dispensed change can be dispensed by using the change ticket. The cash management apparatus manages the expiration date as one piece of information regarding the not-yet-dispensed change. The change handling apparatus judges, on the basis of the expiration date, whether or not the not-yet-dispensed change can be dispensed by using the change ticket.

Further, according to the present invention, in the above invention, the change ticket includes a dispensing code, created by the cash settlement apparatus, for judging whether the change ticket is a genuine change ticket or a counterfeit change ticket. The cash management apparatus manages the dispensing code as one piece of information regarding the not-yet-dispensed change. The change handling apparatus judges whether the change ticket is a genuine change ticket or a counterfeit change ticket, on the basis of the dispensing code included in the change ticket.

Further, according to the present invention, in the above invention, the change handling apparatus judges whether or not the not-yet-dispensed change can be dispensed by using the change ticket, on the basis of an amount of the not-yet-dispensed change obtained on the basis of the information included in the change ticket.

Further, according to the present invention, in the above invention, the change handling apparatus judges that the not-yet-dispensed change can be dispensed, only when the amount of the change is not greater than a maximum amount of change that is possibly paid by the cash settlement apparatus.

Further, according to the present invention, in the above invention, on the change ticket, at least one of the amount of the not-yet-dispensed change, a place where the not-yet-dispensed change can be dispensed, and the expiration date by which the not-yet-dispensed change can be dispensed is described in characters.

Further, according to the present invention, in the above invention, a monetary amount to be discounted from a commodity price when the commodity price is paid in a store where the cash settlement apparatus is located is indicated on the change ticket so that the change ticket can be used as a coupon.

Further, according to the present invention, the above invention further includes a cash register configured to issue a receipt on which information including the commodity price is printed, at the commodity transaction. The change ticket is issued by the cash register that has obtained information regarding the not-yet-dispensed change from the cash settlement apparatus.

Further, the present invention provides a money handling method configured to handle, by using a money handling apparatus, cash that is given and received when commodity transaction is performed. The method includes: a change amount calculating step of causing a cash settlement apparatus to recognize deposited money that is paid for a commodity price by a customer, calculate a total amount of the deposited money, and calculate, as change, a difference between the total amount of the deposited money and the commodity price; a judgment step of judging whether to execute either a process of dispensing change or a process of issuing a change ticket including information that specifies an amount of the change; a change dispensing step of dispensing the change from the cash settlement apparatus, when a result of judgment in the judgment step is to dispense the change; a change ticket issuing step of issuing the change ticket from the cash settlement apparatus or a cash register connected to the cash settlement apparatus, when a result of judgment in the judgment step is to issue the change ticket; a change amount specifying step of causing a change handling apparatus to obtain the information included in the change ticket, and specify an amount of not-yet-dispensed change; and a not-yet-dispensed change dispensing step of dispensing the not-yet-dispensed change equivalent to the amount specified in the change amount specifying step.

Advantageous Effects of the Invention

According to the present invention, usually, change that needs to be paid at commodity transaction is dispensed from the cash settlement apparatus, and when the change cannot be dispensed, for example, when shortage of cash that can be used as change occurs in the cash settlement apparatus, a change ticket can be issued instead of the change. For example, in a store, the cash settlement apparatus is located at a checkout counter such as a register lane while a customer is enabled to receive change by using the change ticket at a service counter or the like apart from the checkout counter, whereby the customer is prevented from waiting for a long time at the checkout counter before receiving the change, and thus congestion at the checkout counter can be avoided. Further, even when change cannot be dispensed from the cash settlement apparatus, information regarding the change is managed by the cash management apparatus so that the change can be dispensed from the change handling apparatus, whereby cash in the store can be strictly managed.

Further, according to the present invention, the expiration date of the change ticket is set, and a customer is allowed to receive change by using the change ticket any time by the expiration date. Therefore, for example, a customer in a hurry can receive change later when the customer has time.

Further, according to the present invention, when a change ticket is issued, a dispensing code capable of judging whether the change ticket is a genuine change ticket or a counterfeit change ticket is created. When a customer requests dispensing of change by using the change ticket, whether the change ticket is a genuine change ticket or a counterfeit change ticket can be judged on the basis of the dispensing code. Therefore, it is possible to prevent the change from being dispensed on the basis of a counterfeit change ticket.

Further, according to the present invention, the range of the amount of change that can be dispensed by using the change ticket can be set. Therefore, it is possible to prevent a lot of money from being dispensed as change by using a counterfeit change ticket.

Further, according to the present invention, when a change ticket is issued, a coupon that can be used as a rebate coupon in the store can be issued for a customer to whom change could not be normally dispensed. Such a coupon expresses an apology to the customer, and eases dissatisfaction of the customer.

Further, according to the present invention, the change ticket can be issued by using a receipt printing function of a cash register such as a POS register which is conventionally used. Therefore, it is possible to suppress costs regarding introduction of the money handling system according to the present invention.

DESCRIPTION OF EMBODIMENTS

Figure 1:
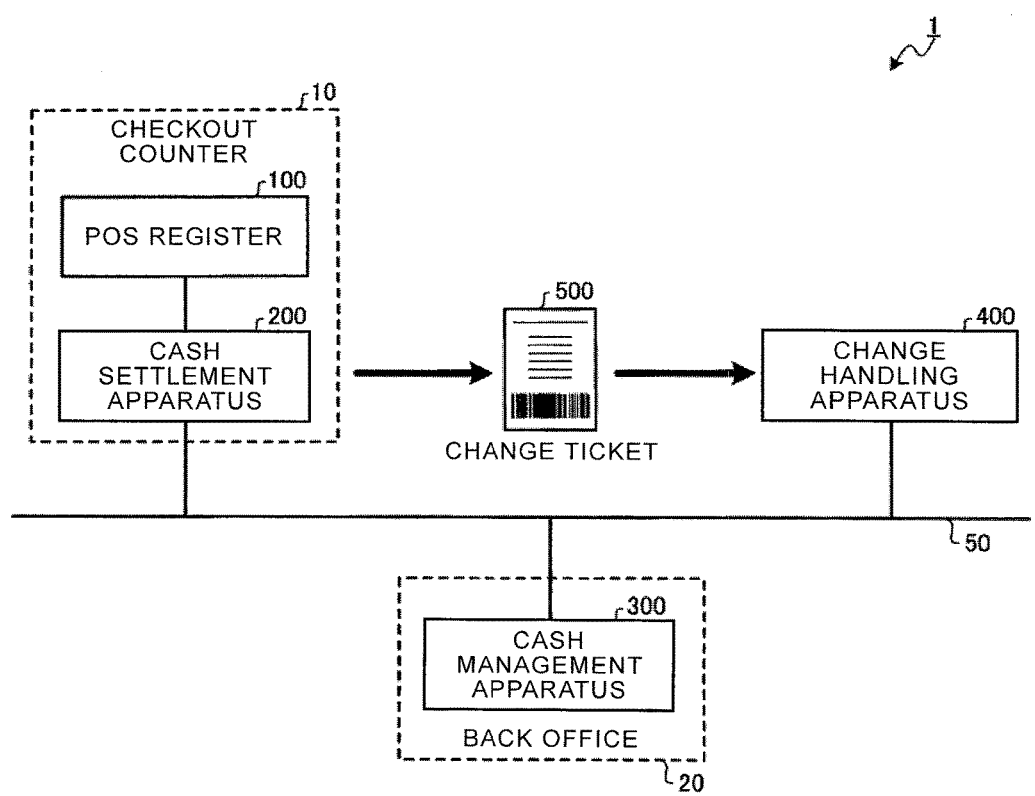
FIG. 1 is a schematic diagram showing an example of a structure of a money handling system according to an embodiment.

Hereinafter, a money handling system and a money handling method according to the present invention will be described with reference to the accompanying drawings. First, the outlines of the money handling system and the money handling method will be described. FIG. 1 is a schematic diagram showing an example of a structure of a money handling system 1 according to the present embodiment.

In a store where the money handling system 1 is located, a POS register 100 and a cash settlement apparatus 200 are located at a checkout counter 10, such as a register lane, in a checkout area where a customer performs checkout for commodities the customer has purchased. A change handling apparatus 400 is located in a place, such as a service counter, apart from the checkout counter 10 in the store. In a back office 20 in the store, a cash management apparatus 300 is located, which is configured to manage information regarding cash that is deposited and dispensed in and from the cash settlement apparatus 200 and the change handling apparatus 400. The cash settlement apparatus 200, the change handling apparatus 400, and the cash management apparatus 300 are communicably connected with each other via a network 50 such as a LAN. The cash settlement apparatus 200 is communicably connected with the POS register 100, and the total amount of the prices of commodities which is calculated by the POS register 100 is inputted to the cash settlement apparatus 200. While only a pair of the POS register 100 and the cash settlement apparatus 200 is shown in FIG. 1, a plurality of pairs of the POS register 100 and the cash settlement apparatus 200 are located at the checkout counter 10. Likewise, while only one change handling apparatus 400 is shown in FIG. 1, a plurality of the change handling apparatus 400 may be used. The mode of installation of the POS register 100 and the cash settlement apparatus 200 at the checkout counter 10 is not particularly limited. A cashier may serve customers at a register lane, or a self-checkout mode may be adopted.

Generally, in the money handling system 1, change is dispensed from the cash settlement apparatus 200, according to need, on the basis of the total amount of the prices of commodities that is calculated by the POS register 100, and the total amount of deposited money from a customer that is inputted to the cash settlement apparatus 200.

Meanwhile, when change cannot be dispensed from the cash settlement apparatus 200, for example, when shortage of cash stored in the cash settlement apparatus 200 occurs and therefore change cannot be dispensed, dispensing of change is not performed, but a change ticket 500 is issued instead. The change ticket 500 is issued by a printer for issuing receipts which is provided in the POS register 100 or by a printer provided in the cash settlement apparatus 200. The issued change ticket 500 includes information for specifying the amount of the not-yet-dispensed change that has not been dispensed from the cash settlement apparatus 200. It is noted that information regarding commodity transaction in which change has not been dispensed from the cash settlement apparatus 200, information regarding the not-yet-dispensed change, and the like are managed by the cash management apparatus 300.

On the change ticket 500, information indicating the location of the change handling apparatus 400 from which the customer can receive the change by using the change ticket 500 is described. The customer goes to the place where the change handling apparatus 400 is located, on the basis of the information described on the change ticket 500.

In the change handling apparatus 400, information regarding the not-yet-dispensed change is obtained from the change ticket 500 of the customer, and the amount of the not-yet-dispensed change is specified. Specifically, for example, a code created by the cash settlement apparatus 200 is printed as a dispensing code on the change ticket 500. The dispensing code and the amount of the not-yet-dispensed change are associated with each other and managed by the cash management apparatus 300. When the dispensing code printed on the change ticket 500 is inputted to the change handling apparatus 400, the change handling apparatus 400 specifies the amount of change with reference to the information managed by the cash management apparatus 300.

When the amount of change to be dispensed by using the change ticket 500 is specified, change equivalent to the specified amount of change is dispensed from the change handling apparatus 400. When the change has been dispensed, the information managed by the cash management apparatus 300 is updated, thereby preventing multiple times of dispensing of change with the same change ticket 500.

As described above, in the money handling system 1, even when change cannot be dispensed from the cash settlement apparatus 200, the change can be dispensed from the change handling apparatus 400 by using the change ticket 500. Since a cashier or the like need not perform the work of manually managing cash and paying change from the cash, it is possible to continue strict cash management.

Figure 2:
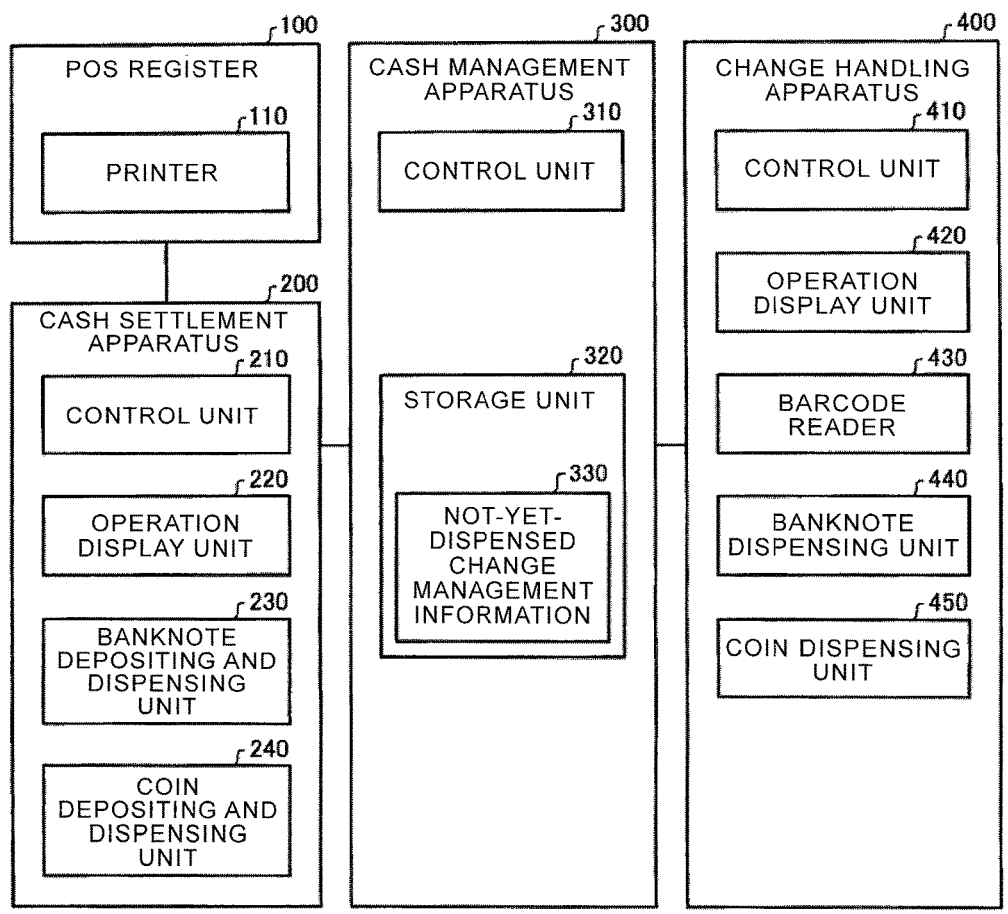
FIG. 2 is a block diagram schematically showing functional structures of apparatuses constituting the money handling system.

Next, the money handling system 1 located in the store will be described in detail. FIG. 2 is a block diagram schematically showing functional structures of the respective apparatuses constituting the money handling system 1. The POS register 100 includes a printer 110 configured to print receipts and change tickets 500. The POS register 100, like the conventional apparatus, includes a barcode reader and an operation display unit, and has a function of reading a barcode assigned to each commodity to obtain information about the price of the commodity, which information is managed by a POS server. In the present embodiment, however, only the content required for describing the money handling system 1 is illustrated.

The cash settlement apparatus 200 includes: a control unit 210; an operation display unit 220 capable of executing input operation and output display for various kinds of information; a banknote depositing and dispensing unit 230 executing depositing and dispensing of banknotes; and coin depositing and dispensing unit 240 executing depositing and dispensing of coins. The cash settlement apparatus 200 is a money handling apparatus capable of executing a money depositing process and a money dispensing process. When deposited money received from a customer for the prices of commodities is inputted to the cash settlement apparatus 200, the cash settlement apparatus 200 recognizes and counts the deposited money to calculate the total amount thereof, and stores the deposited money in a storage unit therein. In addition, the cash settlement apparatus 200 judges whether or not change needs to be dispensed, on the basis of the total amount of the prices of commodities which is inputted from the POS register 100, and the total amount of the deposited money, and dispenses change according to need.

The cash management apparatus 300 includes a control unit 310 and a storage unit 320. The storage unit 320 is a nonvolatile storage device such as a semiconductor memory, a hard disk, or the like. In the storage unit 320, information regarding the change that has not been dispensed from the cash settlement apparatus 200 is managed as not-yet-dispensed change management information 330.

The change handling apparatus 400 includes: a control unit 410; an operation display unit 420 capable of executing input operation and output display for various kinds of information; a barcode reader 430 configured to read a barcode printed on a change ticket 500; a banknote dispensing unit 440 configured to execute dispensing of banknotes; and a coin dispensing unit 450 configured to execute dispensing of coins. The change handling apparatus 400 is a money handling apparatus capable of executing a money dispensing process. The change handling apparatus 400 has a function of reading information included in a change ticket 500 presented by a customer and specifying the amount of change to be dispensed on the basis of the information, and a function of dispensing, as change, cash equivalent to the specified amount of change. The change handling apparatus 400 will be described later in detail.

Figures 3, 4:
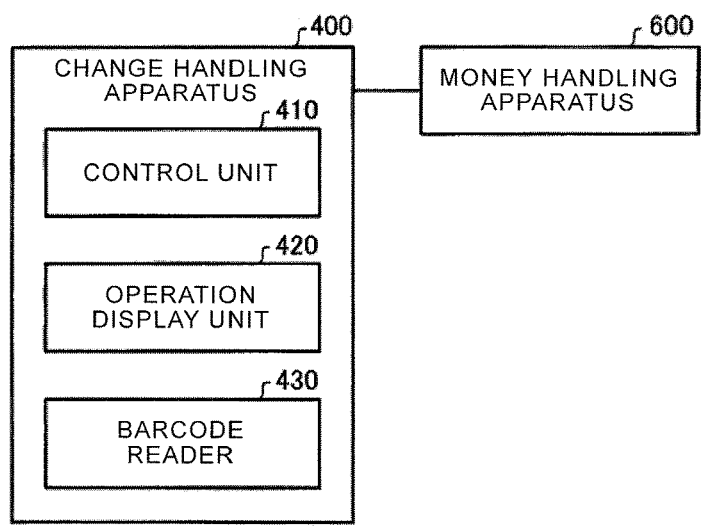
FIG. 3 is a block diagram showing another structure of a change handling apparatus.
FIG. 4 is a diagram showing an example of not-yet-dispensed change management information for managing change that has not been dispensed from a cash settlement apparatus.

While FIG. 2 shows the structure in which change is dispensed from the change handling apparatus 400, the present embodiment is not limited thereto. For example, in another mode, the change handling apparatus 400 may perform only the process of obtaining the information included in the change ticket 500 and specifying the amount of change to be dispensed, while dispensing of change equivalent to the specified amount of change may be performed using another money handling apparatus. FIG. 3 is a block diagram showing another mode of the change handling apparatus 400. As shown in FIG. 3, the change handling apparatus 400 may include only the control unit 410, the operation display unit 420, and the barcode reader 430, while banknote dispensing and coin dispensing may be performed by another money handling apparatus 600 that dispenses banknotes and coins in response to an instruction from the change handling apparatus 400.

In the case where change is not dispensed from the cash settlement apparatus 200, the control unit 210 creates a dispensing code for specifying information regarding this change. In addition, the control unit 210 sets an expiration date by which the not-yet-dispensed change can be dispensed. Then, the control unit 210 transmits, to the cash management apparatus 300, information such as the dispensing code, the amount of the not-yet-dispensed change, the expiration date by which the not-yet-dispensed change can be dispensed from the change handling apparatus 400, etc. In the cash management apparatus 300, the control unit 310 enters the information received from the cash settlement apparatus 200 into the not-yet-dispensed change management information 330 stored in the storage unit 320, thereby managing the information.

FIG. 4 is a diagram showing an example of the not-yet-dispensed change management information 330 managed in the storage unit 320 of the cash management apparatus 300. As shown in FIG. 4, the not-yet-dispensed change management information 330 includes items of: "dispensing code"; "not-yet-dispensed change amount" indicating the amount of not-yet-dispensed change; "expiration date" indicating the date by which dispensing of the not-yet-dispensed change is possible; "occurrence date/time" indicating the date and time when the not-yet-dispensed change occurred; "settlement apparatus ID" indicating an ID number that specifies a cash settlement apparatus 200 in which the not-yet-dispensed change occurred; "date of change dispensing" indicating the date and time when the not-yet-dispensed change was dispensed; and "dispensing apparatus ID" indicating an ID number that specifies a change handling apparatus 400 from which the not-yet-dispensed change was dispensed. In the not-yet-dispensed change management information 330, these pieces of information are managed with management numbers assigned thereto. Since the not-yet-dispensed change management information 330 includes information regarding the ID numbers of the cash settlement apparatus 200 and the change handling apparatus 400, even when a plurality of the cash settlement apparatuses 200 and a plurality of the change handling apparatuses 400 are used, it is possible to identify the cash settlement apparatus 200 in which the not-yet-dispensed change occurred and the change handling apparatus 400 in which the not-yet-dispensed change was handled. Further, since the occurrence date/time and the settlement apparatus ID are recorded in addition to the amount of the not-yet-dispensed change, when the details of the transaction in which the not-yet-dispensed change occurred need to be confirmed, it is possible to confirm the correspondence with in-store transaction history which is managed by the POS server or the like.

The dispensing code is a code created by, for example, inputting the amount of change, the occurrence date/time, and the settlement apparatus ID into a predetermined arithmetic expression, and has a function of a password. When the dispensing code included in the change ticket 500 is inputted to the change handling apparatus 400, this dispensing code is inputted to the predetermined arithmetic expression, whereby the information used for creating the output code, such as the amount of change, the occurrence date/time, and the settlement apparatus ID can be decoded. The information such as the amount of change, the occurrence date/time, and the settlement apparatus ID is managed as the not-yet-dispensed change management information 330 in the storage unit 320 of the cash management apparatus 300, separately from the change ticket 500. Therefore, it is possible to judge that the change ticket 500 is not a counterfeit change ticket by checking whether or not the information such as the amount of change, the occurrence date/time, and the settlement apparatus ID, which has been decoded from the dispensing code inputted to the change handling apparatus 400, i.e., the dispensing code obtained from the change ticket 500, coincides with the information managed in the not-yet-dispensed change management information 330.

The expiration date indicates the date by which the change that has not been dispensed from the cash settlement apparatus 200 can be dispensed by using the change ticket 500. Since the expiration date of the change ticket 500 is provided, if a customer who could not receive change from the cash settlement apparatus 200 is in a hurry, the customer can keep the change ticket 500 and dispense the change later when the customer has time.

Information of management number "001" shown in FIG. 4 indicates that not-yet-dispensed change that occurred in a cash settlement apparatus 200 the settlement apparatus ID of which is "A123 . . . " has already been dispensed from a change handling apparatus 400 the dispensing apparatus ID of which is "B123 . . . ". Information of management number "002" indicates that not-yet-dispensed change that occurred in a cash settlement apparatus 200 the settlement apparatus ID of which is "A456 . . . " has not yet been dispensed. Thus, in the storage unit 320 of the cash management apparatus 300, when not-yet-dispensed change is dispensed from the change handling apparatus 400, the information entered in the not-yet-dispensed change management information 330 is updated to the "already-dispensed state". Therefore, even if someone tries to dispense change again by using the change ticket 500 with which dispensing of change has already been done, it is confirmed that the change has already been dispensed, on the basis of the information entered in the not-yet-dispensed change management information 330, thereby preventing change from being dispensed again.

Figure 5:
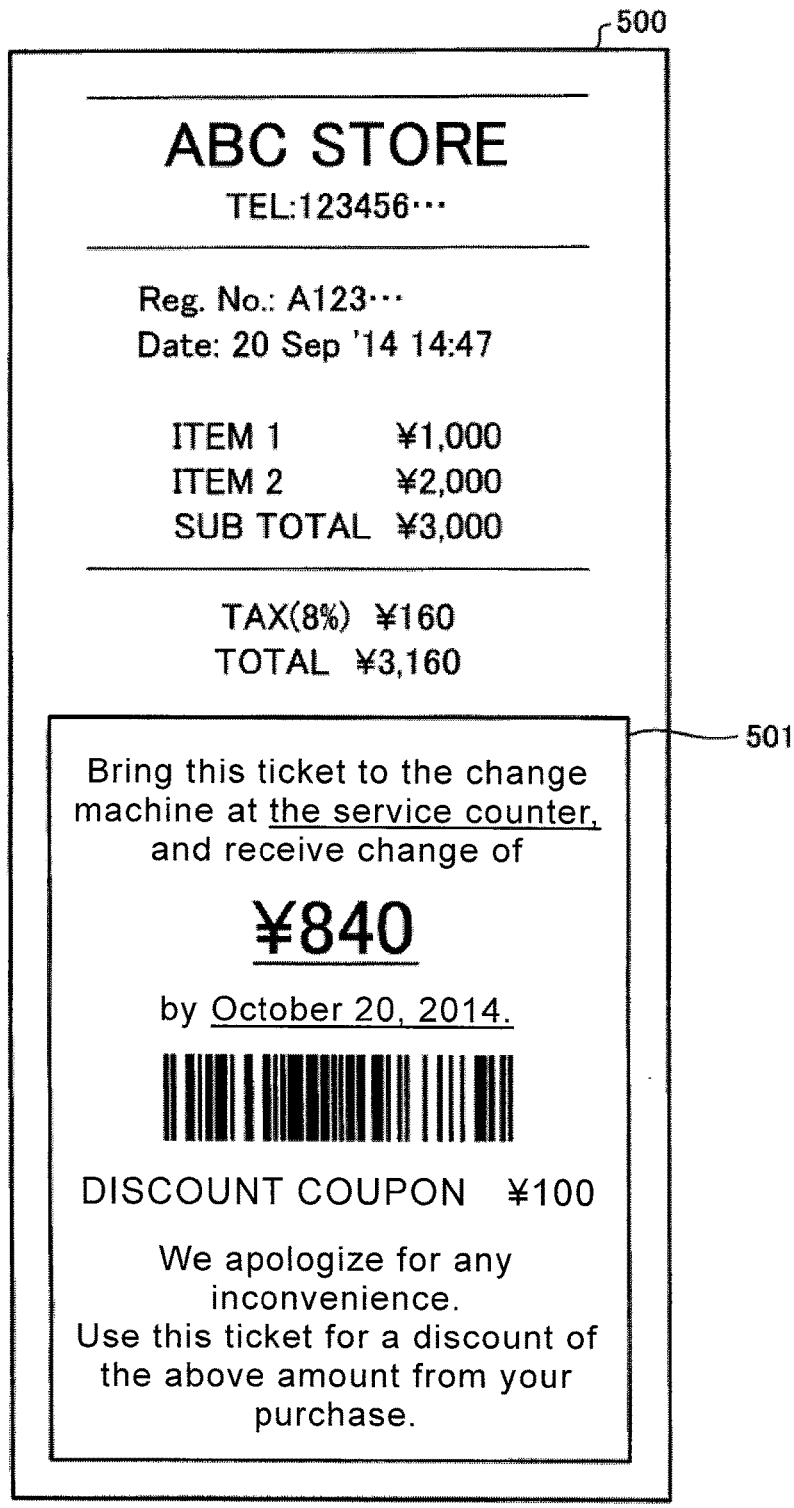
FIG. 5 is a diagram showing an example of a change ticket.

FIG. 5 shows an example of the change ticket 500. This change ticket 500 corresponds to the information of registration number "002" shown in FIG. 4. As shown in FIG. 5, information regarding change that has not been dispensed from the cash settlement apparatus 200 is printed in a lower part of a receipt issued from the POS register 100 when usual transaction is performed, and the receipt with such information is used as the change ticket 500. However, the change ticket 500 and the receipt may be separately printed out. Specifically, only a region 501 in the lower part of the receipt shown in FIG. 5 may be issued as the change ticket 500.

On the change ticket 500, information indicating a place where change can be dispensed by using this ticket, information indicating the amount of the change, information indicating the expiration date by which the change can be dispensed, and information regarding a discount coupon are printed in characters. In addition, a barcode indicating a dispensing code is printed on the change ticket 500. The example shown in FIG. 5 indicates that the not-yet-dispensed change can be dispensed by the expiration date from the change handling apparatus 400 located at the service counter in the store.

The discount coupon printed on the change ticket 500 shown in FIG. 5 is a rebate coupon that is issued to express an apology to a customer who was troubled because the customer could not receive change that was supposed to be paid at the checkout counter 10. By presenting the change ticket 500, the customer can get a discount equivalent to the amount described as the discount coupon from the prices of commodities the customer purchases next time.

In the money handling system 1, it is possible to change settings regarding a discount coupon, such as whether or not the discount coupon should be issued, how much the amount of the discount should be, whether the amount of the discount is fixed or varied according to the total amount of the prices of commodities each customer has purchased or according to the amount of change, and what arithmetic expression is used to determine the amount of discount when the amount of discount is varied, etc. Further, it is also possible to change settings of information regarding the place where the change handling apparatus 400 is located, and the method of setting the expiration date by which change can be dispensed by using the change ticket 500, etc. These settings are changed by operating the operation display unit 220 of the cash settlement apparatus 200, and are stored in a storage unit (not shown) used by the control unit 210. It is noted that the settings can be changed not only by operating the cash settlement apparatus 200 but also by operating the cash management apparatus 300.

In the case where change is not dispensed from the cash settlement apparatus 200, the control unit 210 creates a dispensing code, and converts the dispensing code into a barcode. In addition, the control unit 210, according to the contents of settings, determines the expiration date and the amount of discount, and recognizes the place where the change handling apparatus 400 is located. After the contents to be printed on the change ticket 500 have been determined by the control unit 210, the contents to be printed are transmitted to the POS register 100, and are printed on the change ticket 500 by the printer 110.

The information such as the dispensing code, the amount of change, the expiration date, etc. is transmitted from the cash settlement apparatus 200 to the cash management apparatus 300, and managed as the not-yet-dispensed change management information 330 in the storage unit 320 of the cash management apparatus 300. In the change handling apparatus 400, the control unit 410 recognizes the dispensing code by only causing the barcode reader 430 to read the barcode printed on the change ticket 500, and thus the control unit 410 can specify the amount of the not-yet-dispensed change with reference to the not-yet-dispensed change management information 330 managed in the storage unit 320 of the cash management apparatus 300. Then, the control unit 410 controls the banknote dispensing unit 440 and the coin dispensing unit 450, whereby the not-yet-dispensed change is dispensed from the change handling apparatus 400.

The amount of discount by the discount coupon is also managed in association with the dispensing code printed in the form of a barcode on the change ticket 500. Specifically, after the control unit 210 of the cash settlement apparatus 200 has determined the amount of discount on the basis of the settings, this amount of discount and the dispensing code are transmitted to the POS server (not shown) to be managed in the POS server. Then, when the customer purchases a commodity, the customer causes the barcode reader provided in the POS register 100 to read the barcode on the change ticket 500. Then, the amount of discount is specified on the basis of the dispensing code indicated by the barcode and the information managed in the POS server, and a discount according to the discount coupon is applied to the commodity price being processed in the POS register 100. When the discount coupon has been used, in the POS server, the information regarding the discount coupon is updated to the state indicating that the discount coupon has already been used, thereby preventing the discount coupon to be used multiple times.

The change ticket 500 is not limited to be issued by using the printer 110 of the POS register 100. In another mode, the cash settlement apparatus 200 may have a printer, and the change ticket 500 may be issued by this printer. Hereinafter, the flow of handling performed by the money handling system 1 will be described for an exemplary case where the change ticket 500 is issued from the cash settlement apparatus 200.

Figure 6:
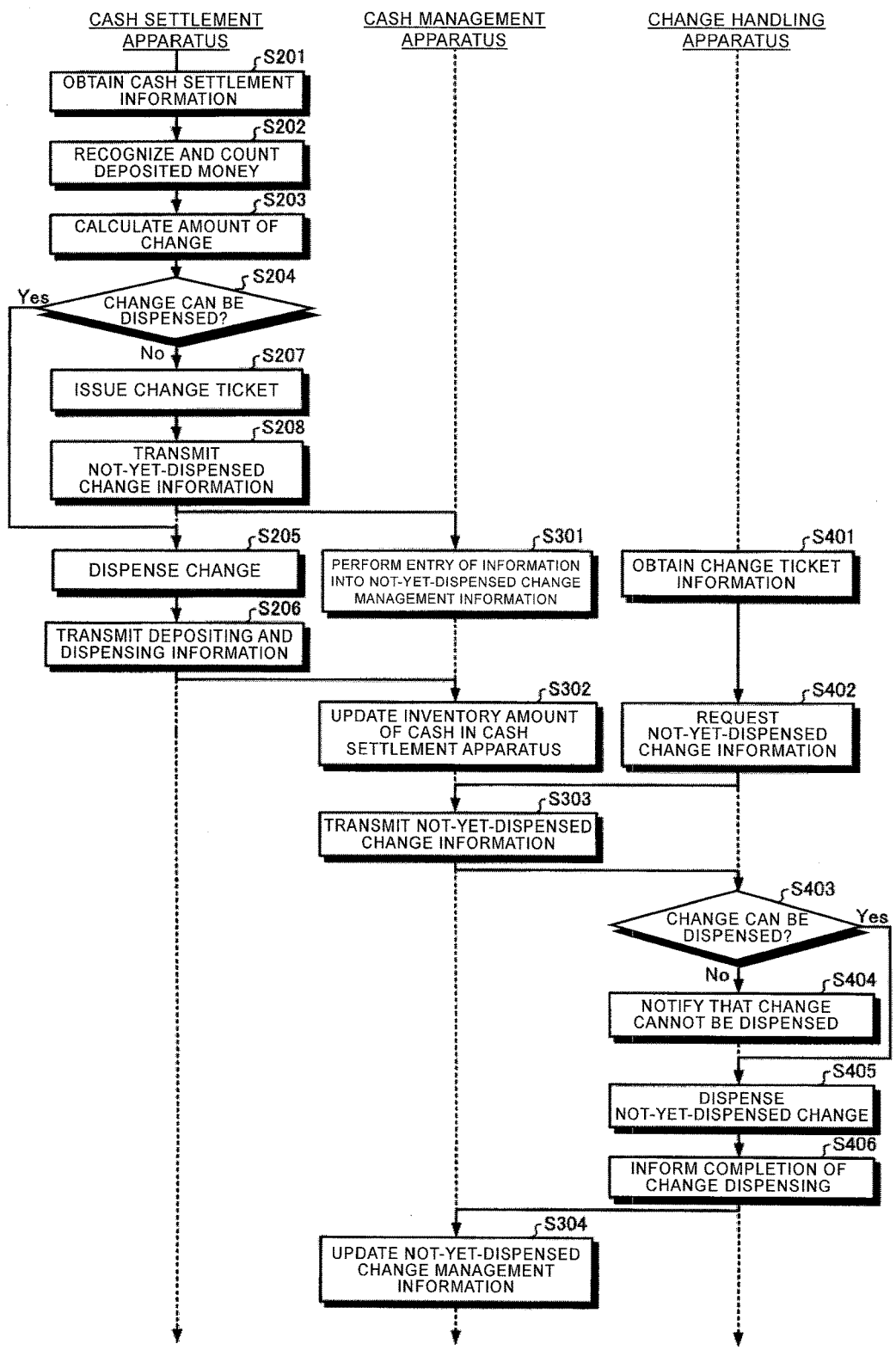
FIG. 6 is a timing chart showing the content of processing performed in the money handling system.

FIG. 6 is a timing chart showing process steps performed in the money handling system 1 from when the process in the cash settlement apparatus 200 is started to when dispensing of change by using the change ticket 500 is performed. In FIG. 6, the processes performed by the cash settlement apparatus 200, the cash management apparatus 300, and the change handling apparatus 400 are arranged in chronological order, and the relationships among the respective apparatuses are also shown.

When a customer performs checkout of commodities they have purchased, firstly, the total amount of the prices of the purchased commodities is calculated by the POS register 100 at the checkout counter 10. The cash settlement apparatus 200 obtains, as cash settlement information, the total amount of the prices of the commodities which is calculated by the POS register 100 (step S201).

When deposited money, i.e., banknotes and/or coins, received from the customer for the commodity prices is inputted to the cash settlement apparatus 200, the deposited money is recognized and counted by the banknote depositing and dispensing unit 230 and the coin depositing and dispensing unit 240 in the cash settlement apparatus 200, whereby the total amount of the deposited money is calculated (step S202). In the cash settlement apparatus 200, the control unit 210 calculates the amount of change on the basis of the total amount of the prices of the commodities obtained from the POS register 100, and the total amount of the deposited money calculated by the banknote depositing and dispensing unit 230 and the coin depositing and dispensing unit 240 (step S203). Subsequently, in the cash settlement apparatus 200, the control unit 210 judges whether or not cash equivalent to the amount of change that has been calculated in advance can be fully dispensed from the inventory amount of banknotes and coins stored for change in the banknote depositing and dispensing unit 230 and the coin depositing and dispensing unit 240 (step S204). If the control unit 210 has judged that the change can be fully dispensed (Yes in step S204), the control unit 210 controls the banknote depositing and dispensing unit 230 and the coin depositing and dispensing unit 240, and the change is dispensed from the cash settlement apparatus 200 (step S205).

Further, in the cash settlement apparatus 200, on the basis of the information regarding the deposited money and the change, i.e., the depositing and dispensing information, the control unit 210 updates the information about the inventory amount of banknotes and coins stored in the banknote depositing and dispensing unit 230 and the coin depositing and dispensing unit 240 managed inside the cash settlement apparatus 200, and transmits the depositing and dispensing information to the cash management apparatus 300 (step S206). In the cash management apparatus 300, on the basis of the information received from the cash settlement apparatus 200, information such as the information about the inventory amount of banknotes and coins stored in the banknote depositing and dispensing unit 230 and the coin depositing and dispensing unit 240 in the cash settlement apparatus 200 is updated (step S302). Although not illustrated in FIG. 6, the information such as the total amount of the deposited money inputted to the cash settlement apparatus 200, the amount of change dispensed from the cash settlement apparatus 200, etc. is also transmitted to the POS register 100. In the POS register 100, a receipt is issued by using the information received from the cash settlement apparatus 200.

Meanwhile, in the cash settlement apparatus 200, if the control unit 210 has judged that the change should not be dispensed because shortage of cash for change will occur (No in step S204), the cash settlement apparatus 200 issues a change ticket 500 (step S207). At this time, in the cash settlement apparatus 200, the control unit 210 creates a dispensing code by entering the amount of the not-yet-dispensed change, the date and time when the not-yet-dispensed change has occurred, the ID number for identifying the cash settlement apparatus 200, etc. in a predetermined arithmetic expression to encode them, and creates a barcode indicating this dispensing code. This barcode is printed on the change ticket 500. Further, in the cash settlement apparatus 200, the control unit 210 transmits, to the cash management apparatus 300, information including the dispensing code, the amount of the not-yet-dispensed change, the date and time when the not-yet-dispensed change has occurred, the ID number of the cash settlement apparatus 200, etc. (S208).

In the cash management apparatus 300, the control unit 310 enters the information received from the cash settlement apparatus 200 into the not-yet-dispensed change management information 330 in the storage unit 320, and manages the information (step S301). Although not illustrated in FIG. 6, information such as the total amount of the deposited money inputted to the cash settlement apparatus 200, the amount of change that would have been dispensed from the cash settlement apparatus 200, etc. is also transmitted to the POS register 100. Thus, even when not-yet-dispensed change has occurred, the POS register 100 issues a receipt by using the information received from the cash settlement apparatus 200.

In the change handling apparatus 400, the control unit 410 obtains information regarding the change from the change ticket 500 issued instead of the change (step S401). Specifically, the customer who has received the change ticket 500 issued by the cash settlement apparatus 200 goes to the place where the change handling apparatus 400 is located, and causes the barcode reader 430 to read the barcode printed on the change ticket 500, whereby the control unit 410 recognizes the dispensing code from the read barcode. In the change handling apparatus 400, the control unit 410 transmits the dispensing code to the cash management apparatus 300, and requests information managed as the not-yet-dispensed change management information 330 in association with the dispensing code in the storage unit 320 of the cash management apparatus 300 (step S402).

In the cash management apparatus 300, the control unit 310 transmits, to the change handling apparatus 400, information such as the amount of change, etc. which is managed in association with the dispensing code, from among the information managed as the not-yet-dispensed change management information 330 in the storage unit 320, on the basis of the dispensing code received from the change handling apparatus 400 (step S303).

In the change handling apparatus 400, the control unit 410 enters the dispensing code obtained from the change ticket 500 into a predetermined arithmetic expression to decode the information such as the amount of change, etc., and judges whether or not the decoded information coincides with the information received from the cash management apparatus 300 (step S403). When these pieces of information do not coincide with each other, the control unit 410 judges that the change cannot be dispensed (No in step S403), and displays information indicating that the change cannot be dispensed, on the operation display unit 420 (step S404). Specifically, for example, if the change ticket 500 is a counterfeit change ticket, the information decoded from the dispensing code indicated by the barcode does not coincide with the information managed in the cash management apparatus 300. Therefore, the change is not dispensed, and information indicating that the change ticket 500 has a problem is displayed on the operation display unit 420.

Also when, in the not-yet-dispensed change management information 330, the not-yet-dispensed change corresponding to the dispensing code on the change ticket 500 has already been dispensed, change is not dispensed, and information indicating that dispensing of change by using the change ticket 500 has already been done is displayed on the operation display unit 420.

Whether or not the change dispensing process by using the change ticket 500 has already been completed can be managed in the money handling system 1. However, information indicating that the change dispensing process has already been completed may be assigned to the change ticket 500 when the change dispensing process is executed. Specifically, for example, the change handling apparatus 400 may be provided with an insertion slot for the change ticket 500 and a printer or a stamping mechanism. When the customer inserts the change ticket 500 into the insertion slot, the barcode on the change ticket 500 is read by the barcode reader 430, and characters or a symbol indicating that handling of change has been completed are printed or stamped on the change ticket 500 by the printer or the stamping mechanism, and thereafter, this change ticket 500 is returned to the customer from the insertion slot. Alternatively, a clerk at the service counter may stamp characters or a symbol on the change ticket 500 when the change handling apparatus 400 is located at the service counter. Thus, by applying, to the change ticket 500, visually recognizable information such as characters or a symbol indicating that the change dispensing process has already been completed, the clerk and the customer can easily recognize whether or not dispensing of change by using the change ticket 500 has already been done.

Besides, in the change handling apparatus 400, judgment regarding to the amount of change is also performed. Specifically, the control unit 410 judges whether or not the amount of not-yet-dispensed change corresponding to the dispensing code on the change ticket 500 exceeds a previously set amount (step S403), and if the amount of not-yet-dispensed change exceeds the set amount (No in step S403), the control unit 410 does not dispense the change and displays, on the operation display unit 420, information indicating that the amount of change is abnormal (step S404). For example, the maximum amount of change that is possibly paid as change in this store is set on the basis of the maximum denomination of money among the denominations of money used in the store and the lowest commodity price among the prices of commodities sold in the store. If the amount of change to be paid based on the change ticket 500 exceeds the set amount, it is judged that any abnormal situation occurs, and the change is not dispensed. Therefore, for example, even if the not-yet-dispensed change management information 330 stored in the storage unit 320 of the cash management apparatus 300 is rewritten by a malicious third party, dispensing of a lot of cash from the change handling apparatus 400 is avoided.

Meanwhile, if the control unit 410 of the change handling apparatus 400 has judged that the change can be dispensed by using the change ticket 500 (Yes in S403), the control unit 410 controls the banknote dispensing unit 440 and the coin dispensing unit 450 so that cash equivalent to the amount described on the change ticket 500 is dispensed from the change handling apparatus 400 (step S405). When dispensing of change based on the change ticket 500 is completed, the control unit 410 in the change handling apparatus 400 transmits a completion notification to the cash management apparatus 300 (step S406).

In the cash management apparatus 300, upon receiving the completion notification from the change handling apparatus 400, the control unit 310 updates the not-yet-dispensed change management information 330 managed in the storage unit 320 (step S304). Specifically, the date of change dispensing is entered in the item of "date of change dispensing" shown in FIG. 4, which is managed by the not-yet-dispensed change management information 330, and the ID number that specifies the change handling apparatus 400 is entered in the term of "dispensing apparatus ID". Since the not-yet-dispensed change management information 330 managed in the storage unit 320 of the cash management apparatus 300 is updated to the state indicating that the change has already been dispensed by using the change ticket 500, multiple times of dispensing of change with the same change ticket 500 is avoided.

In the present embodiment, change that has not been dispensed by the cash settlement apparatus 200 is dispensed by the banknote dispensing unit 440 and the coin dispensing unit 450 of the change handling apparatus 400 or by another money handling apparatus 600 connected to the change handling apparatus 400. However, the present embodiment is not limited to this configuration. For example, in another mode, only the process of reading information from the change ticket 500 to specify the amount of not-yet-dispensed change may be performed by the change handling apparatus 400, while dispensing of change corresponding to the specified amount of change may be performed by a predetermined clerk from cash manually managed by the clerk, or may be performed by the clerk using a money handling apparatus such as a cash register. For example, a clerk manages a predetermined amount of cash at a service counter where the change handling apparatus 400 is located, and this clerk causes the barcode reader 430 of the change handling apparatus 400 to read the change ticket 500 presented by a customer. In the change handling apparatus 400, the control unit 410 specifies the amount of not-yet-dispensed change on the basis of a dispensing code obtained from the change ticket 500, and displays the amount of change on the operation display unit 420. The clerk at the service counter performs manual dispensing, that is, pays cash equivalent to the amount of change displayed on the operation display unit 420 from the money manually managed by the clerk, and operates the operation display unit 420 to input information indicating that change dispensing is completed. Upon receiving this information, the control unit 410 transmits a completion notification to the cash management apparatus 300. Thus, by manually performing the change dispensing process based on the change ticket 500 while operating the change handling apparatus 400, the customer is allowed to receive, at the service counter, the change that has not been dispensed from the cash settlement apparatus 200, while the information regarding the not-yet-dispensed change is strictly managed. Also in this case, since only the predetermined clerk, who is reliable and assigned to the service counter where the change handling apparatus 400 is located, performs the cash handling process regarding the not-yet-dispensed change, it is possible to strictly manage the cash in the store.

Dispensing of change based on the change ticket 500 is not limited to a mode in which only one of mechanical dispensing in which change is dispensed by the banknote dispensing unit 440 and the coin dispensing unit 450 of the change handling apparatus 400 and manual dispensing in which change is paid from cash manually managed by a clerk, is performed. For example, both a change handling apparatus 400 for mechanical dispensing and a change handling apparatus 400 for manual dispensing may be installed so as to deal with both mechanical dispensing and manual dispensing. Alternatively, one change handling apparatus 400 may be configured to deal with both mechanical dispensing and manual dispensing. In this case, usually mechanical dispensing is executed, and when mechanical dispensing cannot be performed because of shortage of cash for change dispensing or the like, the process of manual dispensing may be performed. In the case where a plurality of change handling apparatuses 400 corresponding to mechanical dispensing are installed, even if shortage of cash occurs in one change handling apparatus 400 and this apparatus 400 becomes incapable of performing mechanical dispensing, mechanical dispensing can be performed by the other change handling apparatus 400. In the case where only one change handling apparatus 400 is installed, mechanical dispensing cannot be performed if shortage of cash for change occurs in this apparatus 400. However, by using a change handling apparatus 400 configured to deal with both mechanical dispensing and manual dispensing, change dispensing can be continued by manual dispensing even if mechanical dispensing cannot be performed. Specifically, in the case where the change handling apparatus 400 becomes incapable of performing mechanical dispensing, the control unit 410 of the change handling apparatus 400 notifies a clerk or the like at the service counter of this situation by means of sound, light, information display on the operation display unit 420, or the like. Upon receiving this notification, the clerk manually performs change dispensing by using the manually managed cash while operating the change handling apparatus 400. Thus, even when the change handling apparatus 400 becomes incapable of performing mechanical dispensing, it is possible to continue the process of change dispensing based on the change ticket 500.

Further, according to the present embodiment, not-yet-dispensed change that has not been dispensed from the cash settlement apparatus 200 is dispensed from the change handling apparatus 400 by using the change ticket 500. However, in another mode, this change dispensing may be performed by using another cash settlement apparatus 200. That is, a cash settlement apparatus 200 may be used as a change handling apparatus 400. Specifically, for example, when a cash settlement apparatus 200 at a certain register lane becomes incapable of dispensing change, a change ticket 500 issued at this register lane is brought to another register lane, and the not-yet-dispensed change that has not been dispensed is dispensed from a cash settlement apparatus 200 having the function of a change handling apparatus 400. For example, a cash settlement apparatus 200 located at a register lane is configured to operate as a change handling apparatus 400 by using a barcode reader provided in a POS register 100. Thus, the cash settlement apparatus 200 operating as a change handling apparatus 400 may read a barcode on the change ticket 500 issued at another register lane, with the barcode reader of the POS register 100, thereby to dispense the not-yet-dispensed change that has not been dispensed with reference to the not-yet-dispensed change management information 330.

In the present embodiment, not-yet-dispensed change occurs when shortage of cash for change occurs. However, the present embodiment is not limited thereto. For example, even when the cash settlement apparatus 200 becomes incapable of dispensing change because of a malfunction or the like that occurs therein, the above-described function and operation enables handing of not-yet-dispensed change on the basis of a change ticket 500. That is, in the cash settlement apparatus 200, the control unit 210 judges, on the basis of predetermined conditions such as shortage of cash for change, malfunction, and the like, whether a process of dispensing change is to be performed or a process of issuing a change ticket 500 is to be performed. Then, upon judging that a change ticket 500 is to be issued without dispensing change, the above-described process based on the change ticket 500 is executed. In this case, even if the full amount of the change is not dispensed or a part of the change is dispensed while the other part thereof is not dispensed, this fully or partially not-yet-dispensed change can be handled by using the change ticket 500.

As described above, according to the present embodiment, even if shortage of cash for change stored in the cash settlement apparatus 200 occurs, a change ticket 500 being issued by the cash settlement apparatus 200 enables dispensing of change from the change handling apparatus 400. Therefore, a cashier need not hand change to a customer on the spot, whereby strict management of cash can be continued.

For example, in the case where the POS register 100 and the cash settlement apparatus 200 are located at a checkout counter such as a register lane, a queue of customers waiting for checkout at the register lane can be avoided by locating the change handling apparatus 400 in a place different from the register lane.

In addition, since a customer can dispense change from the change handling apparatus 400 even on the next day or later by the expiration date, it is possible to avoid a situation that the customer is caused to wait for a long time because the cash settlement apparatus 200 cannot dispense the change.

INDUSTRIAL APPLICABILITY

As described above, the money handling system and the money handling method according to the present invention are techniques useful for continuing strict management of cash without causing a customer to wait even when shortage of cash for change occurs in a money handling apparatus that dispenses change when commodity transaction is performed.

DESCRIPTION OF THE REFERENCE CHARACTERS

1 money handling system
10 checkout counter
20 back office
50 network
100 POS register
110 printer
200 cash settlement apparatus
210, 310, 410 control unit
220, 420 operation display unit
230 banknote depositing and dispensing unit
240 coin depositing and dispensing unit 300 cash management apparatus
310 control unit
320 storage unit
400 change handling apparatus
430 barcode reader
440 banknote dispensing unit
450 coin dispensing unit
600 money handling apparatus

The invention claimed is:

1. A money handling system configured to handle cash that is given and received when a commodity transaction is performed, the system comprising:
   a cash settlement apparatus configured to, in a case where cash corresponding to a difference between a total amount of money paid for a commodity price by a customer and the commodity price is required to be paid as change to the customer, execute either a process of dispensing the change or a process of issuing a change ticket including information that specifies an amount of the change;
   a change handling apparatus configured to, in order to pay not-yet-dispensed change to the customer, obtain the information included in the change ticket and specify an amount of the not-yet-dispensed change; and
   a cash management apparatus communicably connected to the cash settlement apparatus and the change handling apparatus, and configured to manage information regarding the not-yet-dispensed change for which the change ticket has been issued;
   wherein the cash management apparatus manages a date when the not-yet-dispensed change has occurred, the amount of the not-yet-dispensed change and a date when the not-yet-dispensed change has been dispensed based on the change ticket.

2. The money handling system according to claim 1, wherein
   the cash settlement apparatus determines to perform the process of dispensing the change when the change can be dispensed by using the cash stored in the cash settlement apparatus for dispensing change, and
   the cash settlement apparatus determines to perform the process of issuing the change ticket when the change cannot be dispensed by using the cash due to shortage of the cash stored in the cash settlement apparatus for dispensing change.

3. The money handling system according to claim 1, wherein
   the cash settlement apparatus, when issuing the change ticket, sets an expiration date by which the not-yet-dispensed change can be dispensed by using the change ticket,
   the cash management apparatus manages the expiration date as one piece of the information regarding the not-yet-dispensed change, and
   the change handling apparatus judges, on the basis of the expiration date, whether or not the not-yet-dispensed change can be dispensed by using the change ticket.

4. The money handling system according to claim 1, wherein
   the change ticket includes a dispensing code for judging whether the change ticket is a genuine change ticket or a counterfeit change ticket, the dispensing code being created by the cash settlement apparatus,
   the cash management apparatus manages the dispensing code as one piece of the information regarding the not-yet-dispensed change, and
   the change handling apparatus judges whether the change ticket is a genuine change ticket or a counterfeit change ticket, on the basis of the dispensing code included in the change ticket.

5. The money handling system according to claim 1, wherein
   the change handling apparatus judges whether or not the not-yet-dispensed change can be dispensed by using the change ticket, on the basis of the amount of the not-yet-dispensed change.

6. The money handling system according to claim 5, wherein
   the change handling apparatus judges that the not-yet-dispensed change is to be dispensed, only when the amount of the not-yet-dispensed change is not greater than a maximum amount of change that is possibly paid by the cash settlement apparatus for the commodity transaction.

7. The money handling system according to claim 1, wherein
   on the change ticket, at least one of the amount of the not-yet-dispensed change, a place where the not-yet-dispensed change can be dispensed, and the expiration date by which the not-yet-dispensed change can be dispensed is described in characters.

8. The money handling system according to claim 1, wherein
   a monetary amount to be discounted from a commodity price when the commodity price is paid in a store where the cash settlement apparatus is located is indicated on the change ticket so that the change ticket can be used as a coupon.

9. The money handling system according to claim 1, further including a cash register configured to issue a receipt on which information including the commodity price is printed when the commodity transaction is performed, and
   the change ticket is issued by the cash register that has obtained information regarding the not-yet-dispensed change from the cash settlement apparatus.

10. The money handling system according to claim 1, wherein the change handling apparatus dispenses the not-yet-dispensed change on the basis of the amount specified from the information of the change ticket.

11. The money handling system according to claim 1, further comprising a money handling apparatus configured to dispense money,
   wherein the money handling apparatus dispenses the not-yet-dispensed change on the basis of the amount specified from the information of the change ticket by the change handling apparatus.

12. The money handling system according to claim 1, wherein the cash management apparatus further manages an ID that specifies the cash settlement apparatus in which the not-yet-dispensed change has been occurred and an ID that specifies the change handling apparatus that has dispensed the not-yet-dispensed change based on the change ticket.

13. A money handling method configured to handle, by using a money handling system, cash that is given and received when a commodity transaction is performed, the method comprising:
   a change amount calculating step of causing a cash settlement apparatus to recognize money paid for a commodity by a customer, calculate a total amount of paid money, and calculate, as change, a difference between the total amount of the paid money and a price of the commodity;

a judgment step of judging whether to execute either a process of dispensing change or a process of issuing a change ticket including information that specifies an amount of the change;

a change dispensing step of dispensing the change from the cash settlement apparatus when a result of judgment in the judgment step is to dispense the change;

a change ticket issuing step of issuing the change ticket from the cash settlement apparatus or a cash register connected to the cash settlement apparatus when a result of judgment in the judgment step is to issue the change ticket;

a change amount specifying step of causing a change handling apparatus to obtain the information included in the change ticket, and specify an amount of the not-yet-dispensed change;

a not-yet-dispensed change dispensing step of dispensing the not-yet-dispensed change equivalent to the amount of change specified in the change amount specifying step; and a cash management step of managing a date when the not-yet-dispensed change has occurred, the amount of the not-yet-dispensed change, and a date when the not-yet-dispensed change has been dispensed based on the change ticket.

14. The money handling method according to claim 13, wherein in the judgment step, when the amount of the change is equal to or less than an amount of cash that can be dispensed as change from the cash settlement apparatus, the change dispensing step is performed, and when the amount of the change is greater than the amount of cash that can be dispensed as change from the cash settlement apparatus, the change ticket issuing step is performed.

15. The money handling method according to claim 13, wherein the cash management step further includes the step of managing an ID that specifies the cash settlement apparatus in which the not-yet-dispensed change has been occurred and an ID that specifies the change handling apparatus that has dispensed the not-yet-dispensed change based on the change ticket.

* * * * *